(12) United States Patent
Oh

(10) Patent No.: US 7,264,214 B2
(45) Date of Patent: Sep. 4, 2007

(54) STOCK BAR AND T-BAR COUPLING STRUCTURE FOR MOUNTING SPRINKLER

(75) Inventor: Seung-il Oh, Seoul (KR)

(73) Assignee: Kofulso Co., Ltd., Incheon-si (KR)

( * ) Notice: Subject to any disclaimer, the term of this patent is extended or adjusted under 35 U.S.C. 154(b) by 127 days.

(21) Appl. No.: 11/228,231

(22) Filed: Sep. 19, 2005

(65) Prior Publication Data

US 2007/0063121 A1 Mar. 22, 2007

(51) Int. Cl.
*B42F 13/00* (2006.01)
(52) U.S. Cl. .............. 248/342; 248/343; 248/62; 248/65; 248/75; 248/317; 52/220.6; 52/506.06; 52/506.07; 52/506.08; 52/712; 52/715; 169/16; 169/37; 169/43; 24/292; 24/295; 403/231; 403/346; 403/403
(58) Field of Classification Search ........... 248/342, 248/343, 62, 65, 75, 317; 52/506.06, 506.07, 52/506.08, 220.6, 712, 715; 24/292, 295; 403/231, 346, 403; 169/43, 16, 37
See application file for complete search history.

(56) References Cited

U.S. PATENT DOCUMENTS

| | | | |
|---|---|---|---|
| 2,375,513 A | 5/1945 | Bach | 248/72 |
| 3,341,909 A | 9/1967 | Havener | 248/72 |
| 3,556,452 A | 1/1971 | Ramsey | 248/343 |
| 3,558,091 A | 1/1971 | Bush | 248/317 |
| 3,608,857 A | 9/1971 | Hibbeler | 248/317 |
| 3,612,461 A | 10/1971 | Brown | 248/317 |
| 3,652,780 A | 3/1972 | Wilson | 248/72 |
| 3,874,035 A | 4/1975 | Schuplin | 248/72 |
| 4,135,692 A | 1/1979 | Ferguson | 248/317 |
| 4,149,693 A * | 4/1979 | LoNigro | 248/342 |
| 4,408,428 A | 10/1983 | Brooke et al. | 52/506.07 |
| 4,544,119 A | 10/1985 | Kellett et al. | 248/58 |
| 4,717,099 A | 1/1988 | Hubbard | 248/57 |
| 4,723,749 A | 2/1988 | Carraro et al. | 248/317 |
| 5,595,363 A | 1/1997 | DeLeebeeck | 248/72 |
| 5,667,181 A | 9/1997 | Van Leeuwen et al. | 248/343 |
| 6,123,154 A * | 9/2000 | MacDonald et al. | 169/37 |
| 6,260,810 B1 | 7/2001 | Choi | 248/65 |
| 6,341,466 B1 * | 1/2002 | Kehoe et al. | 52/712 |
| 6,345,800 B1 * | 2/2002 | Herst et al. | 248/342 |
| 6,554,231 B2 * | 4/2003 | Choi | 248/65 |
| 6,811,130 B1 * | 11/2004 | Oh | 248/343 |
| 2005/0139743 A1 * | 6/2005 | Shim | 248/342 |
| 2006/0192067 A1 * | 8/2006 | Oh | 248/342 |

* cited by examiner

*Primary Examiner*—Carl D. Friedman
*Assistant Examiner*—Nkeisha J. Dumas
(74) *Attorney, Agent, or Firm*—Jacobson Holman PLLC

(57) ABSTRACT

Disclosed herein is a stock bar and T-bar coupling structure for mounting a sprinkler. In the present invention, a locking bracket is easily securely coupled to a T-bar using an elastic locking unit and a wing bolt. Furthermore, a stock bar made of standard rectangular pipe is coupled to the locking bracket by a first locking unit such that the stock bar crosses over the T-bar. Because this locking bracket is manufactured as a separate component from the stock bar, the present invention can be used without limiting the distance between the T-bars. Furthermore, the present invention has an advantage in that a standard rectangular pipe can be easily used as a stock bar merely by cutting the pipe to a desired length.

3 Claims, 9 Drawing Sheets

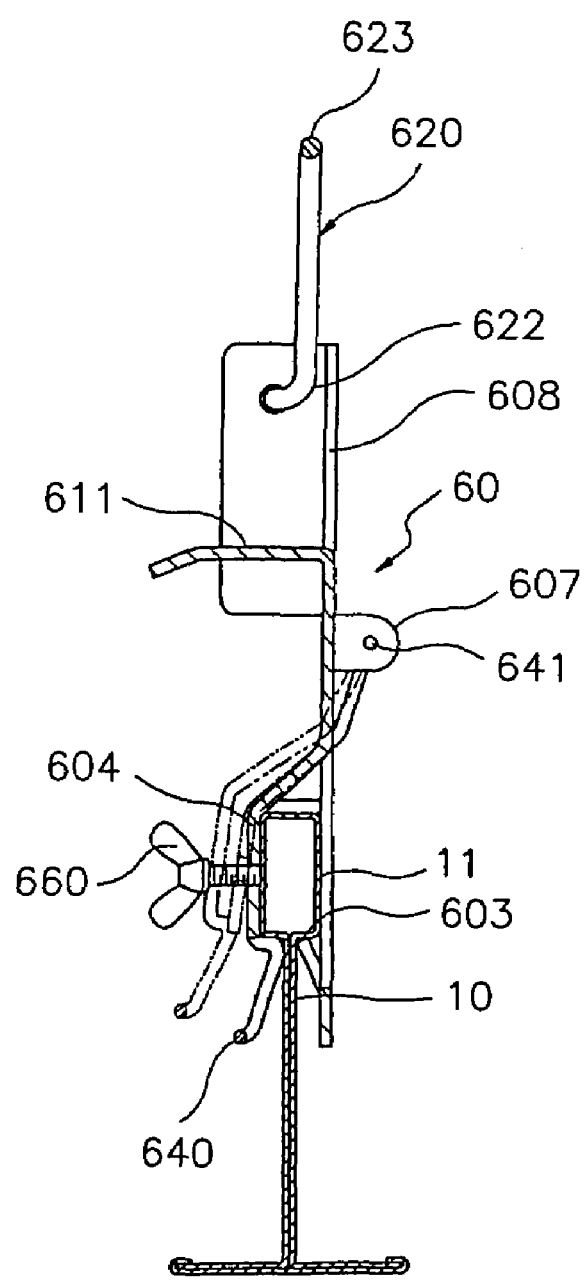

STOCK BAR AND T-BAR COUPLING STRUCTURE FOR MOUNTING SPRINKLER

BACKGROUND OF THE INVENTION

1. Field of the Invention

The present invention relates generally to stock bar and T-bar coupling structures for mounting sprinklers and, more particularly, to a stock bar and T-bar coupling structure for mounting a sprinkler by which a stock bar having a snap clamp can be securely mounted to a T-bar at a precise position through a simple process.

2. Description of the Related Art

As well known to those skilled in the art, to mount a sprinkler, a stock bar is coupled to T-bars so as to be perpendicular to the T-bars, and a sprinkler reducer is then supported by a snap clamp, which is provided on the stock bar.

FIG. 1 is a view showing a sprinkler mounting structure which was proposed in U.S. patent application Ser. No. 11/006,233 which was filed by the inventor of the present invention. As shown in the drawing, the conventional sprinkler mounting structure includes two T-bars 1, which are mounted on the ceiling of a building, and each of which has a held part 1a on an upper side thereof. The sprinkler mounting structure further includes a stock bar 2 which has bent parts 2a at opposite ends thereof. Each bent part 2a has an elastic unit 3, which has a bent hook 3a. The bent hook 3a is hooked to the held part 1a of the T-bar 1 when the bent part 2a is coupled to the T-bar 1. The sprinkler mounting structure further includes a snap clamp 4 which is fitted over the stock bar 2. A sprinkler reducer 6 is inserted into a side of the snap clamp 4, and a locking unit 5 is rotatably provided on the snap clamp 4 adjacent to a mouth defined the other side of the snap clamp 4.

However, in the conventional sprinkler mounting structure, because the stock bar 2 and the bent parts 2a, each having the elastic unit 3, are integrated with each other, if the distance between the T-bars 1 is not correct, the sprinkler mounting process cannot be conducted. Furthermore, the elastic unit 3 ensures sufficient coupling force between the T-bar 1 and the stock bar 2 in upward and downward directions, but it applies an elastic holding force only in the longitudinal direction of the T-bar. Therefore, the stock bar 2 may be undesirably moved by outside forces during a sprinkler mounting process, so that a worker must conduct a process of adjusting the position of the sprinkler after the sprinkler mounting process has been completed.

SUMMARY OF THE INVENTION

Accordingly, the present invention has been made keeping in mind the above problems occurring in the prior art, and an object of the present invention is to provide a stock bar and T-bar coupling structure for mounting a sprinkler in which a coupling bracket that is separate from the stock bar is used as a means for coupling the stock bar to the T-bars, so that a sprinkler mounting process can be easily conducted regardless of the distance between the T-bars, and which makes it possible for a standard rectangular pipe, which can be readily purchased, to be used as the stock bar.

Another object of the present invention is to provide a stock bar and T-bar coupling structure for mounting a sprinkler in which a wing bolt is tightened to the T-bar through the coupling bracket after the coupling bracket has been mounted to the T-bar, so that the stock bar is securely fastened to the T-bar and does not move in the longitudinal direction of the T-bar.

In order to accomplish the above object, the present invention provides a stock bar and T-bar coupling structure for mounting a sprinkler, including: a pair of T-bars, with a held part provided along an upper end of each of T-bars; a stock bar having thereon a snap clamp, to which a sprinkler reducer is fastened by a locking means; and a pair of mounting brackets to couple the stock bar to the upper ends of the T-bars in a direction crossing the T-bars. Each of the mounting brackets includes a bracket main body, having: a pair of insertion notches formed in opposite side edges of the bracket main body; a pair of bent parts provided under the respective insertion notches and corresponding to the upper end of each T-bar; a pair of stoppers provided below the respective insertion notches and corresponding to the held part of the T-bar; a coupling bent part provided at a central position in the bracket main body, so that the T-bar is inserted into the coupling bent part, with a bolt hole formed at a predetermined position through the coupling bent part; a pair of support protrusions bent inwards above the respective insertion notches, with a pair of first shaft holes formed through the respective support protrusions; and a mounting part provided above the support protrusions, so that the stock bar is placed over the mounting part, with a pair of second shaft holes formed through the respective opposite sidewalls of a mouth of the mounting part. Each of the mounting brackets further includes a first locking unit, having: a pair of first rotating shafts provided on opposite ends of the first locking unit, so that the first rotating shafts are inserted into the respective second shaft holes of the mounting part of the bracket main body; a pair of pressing parts bent inwards based on an axis passing through the first rotating shafts; and a first handle protruding from the pressing parts to allow a user to hold the first handle and rotate the first locking unit. Each of the mounting brackets further includes an elastic locking unit, having: a pair of insertion parts provided on opposite ends of the elastic locking unit, so that the insertion parts are inserted into the respective first shaft holes of the support protrusions of the bracket main body; a pair of hook parts extending from the respective insertion parts and placed in the respective insertion notches of the bracket main body, so that the hook parts are hooked to the held part of the T-bar; and an insertion guide part extending downwards from the hook parts, so that the T-bar is inserted between the bracket main body and the elastic locking unit while being guided by the insertion guide part. Each of the mounting brackets further includes a tightening means tightened into the bolt hole of the coupling bent part of the bracket main body and pressing a lower part of the held part of the T-bar.

BRIEF DESCRIPTION OF THE DRAWINGS

The above and other objects, features and advantages of the present invention will be more clearly understood from the following detailed description taken in conjunction with the accompanying drawings, in which:

FIGS. 5A through 5D are views showing a process of coupling a stock bar to a T-bar using the mounting bracket of the sprinkler mounting structure according to the present invention;

DESCRIPTION OF THE PREFERRED EMBODIMENTS

Hereinafter, a preferred embodiment of the present invention will be described in detail with reference to the attached drawings.

Figure 1:
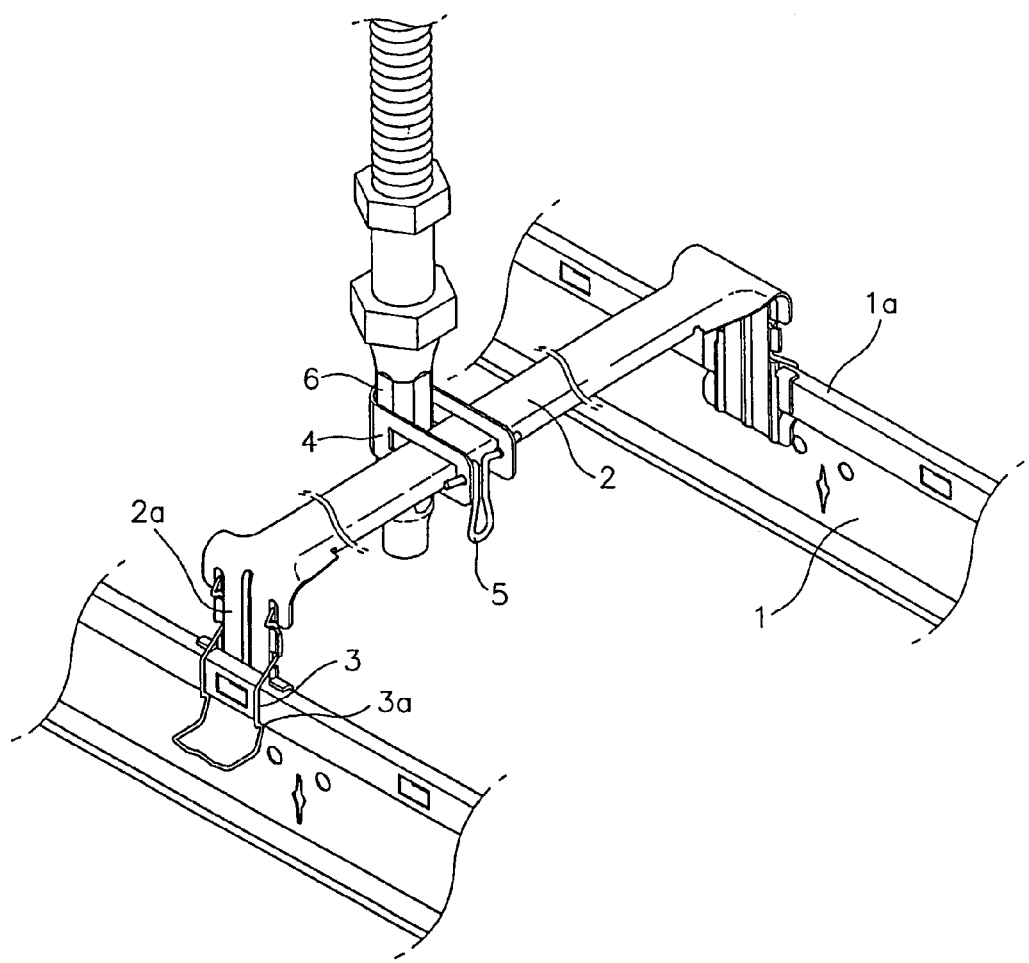
FIG. 1 is a perspective view showing a conventional mounting structure for sprinklers.
Figure 2:
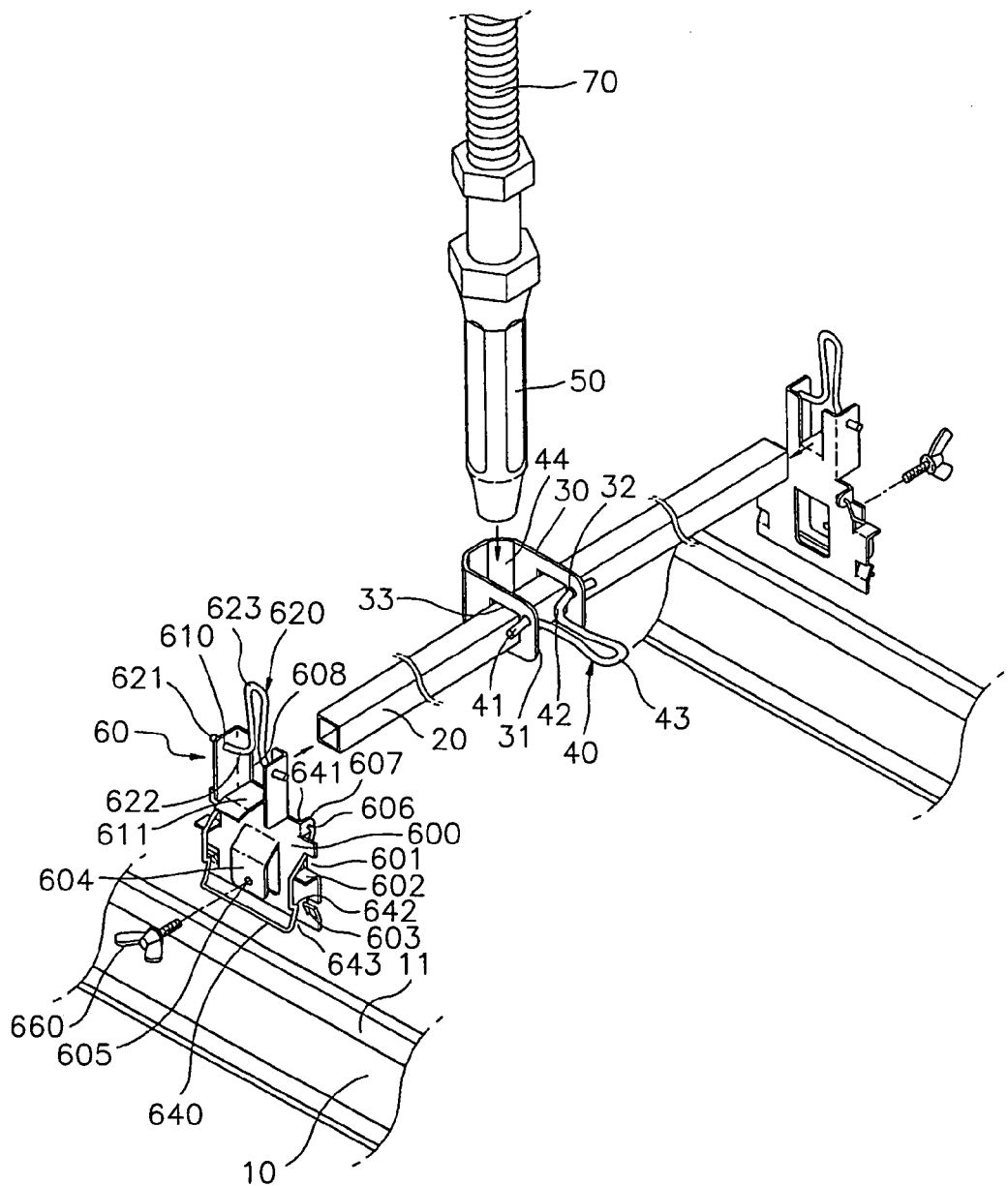
FIG. 2 is an exploded perspective view of a mounting structure for sprinklers, according to an embodiment of the present invention.
Figure 3:
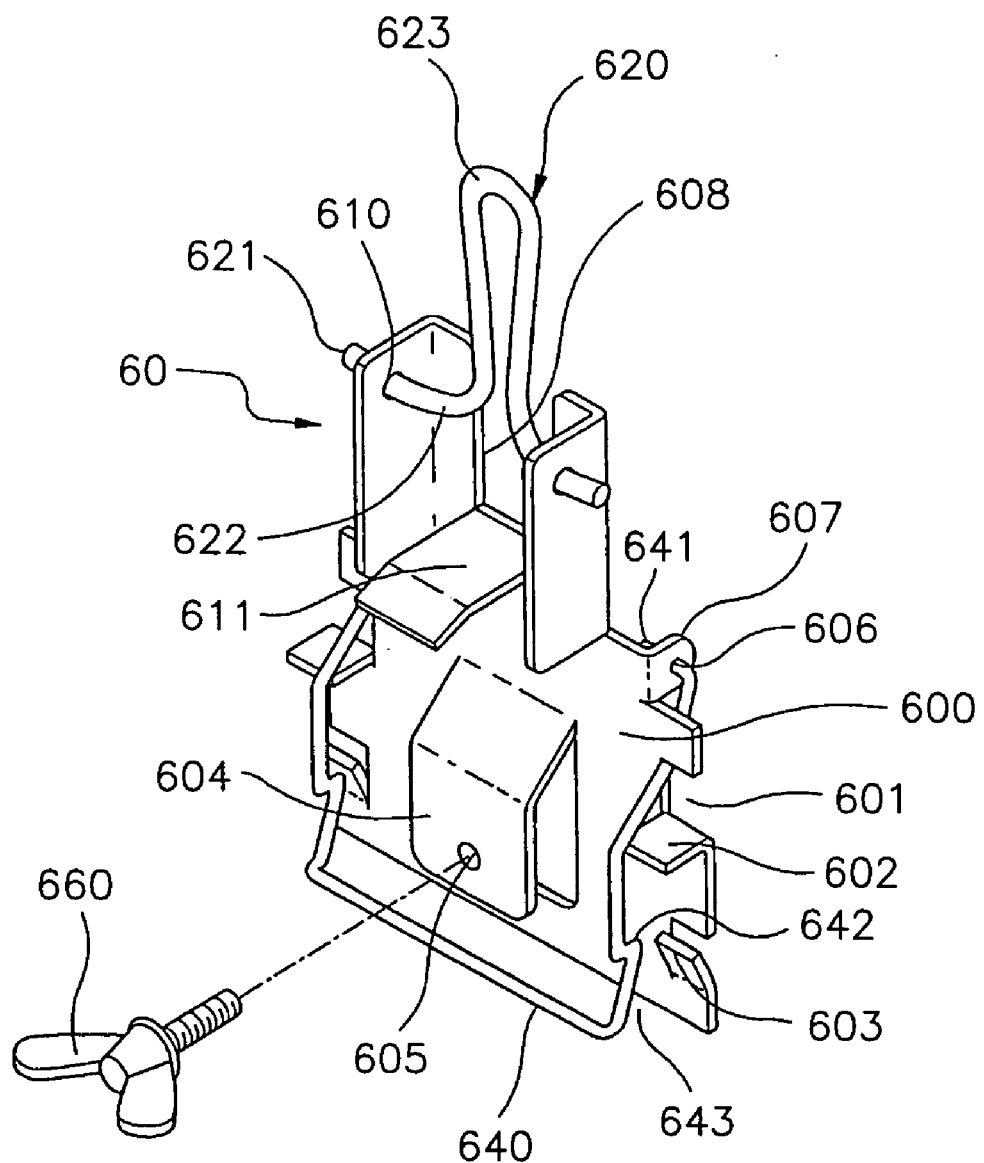
FIG. 3 is a perspective view showing a mounting bracket of the sprinkler mounting structure of FIG. 2.

FIG. 2 is an exploded perspective view of a sprinkler mounting structure using components which couple a stock bar 20 and T-bars 10 to each other, according to the preferred embodiment of the present invention.

As shown in the drawing, the sprinkler mounting structure includes the T-bars 10, each of which has a held part 11 on an upper end thereof. The sprinkler mounting structure further includes the stock bar 20 which has thereon a snap clamp 30, to which a sprinkler reducer 50 is fastened by a locking means 40, and two mounting brackets 60 which couple the stock bar 20 to the upper ends of the T-bars 10 in a direction crossing the T-bars 10.

The T-bars 10 are standardized structures which are mounted to a ceiling panel, which is not shown. The held part 11 is provided along the upper end of each T-bar 10.

The stock bar 20 is made by cutting a pipe, having a rectangular cross-section, to a desired length.

The snap clamp 30 has a U shape when viewing it in a plan view. A third shaft hole 32 is formed through each sidewall of the snap clamp 30 at a predetermined position adjacent to a mouth 31 of the snap clamp 30. Furthermore, an insertion hole 33, which has a width greater than the width of the stock bar 20, is formed at a predetermined position through each sidewall of the snap clamp 30. When the stock bar 20 is inserted into the insertion holes 33, a space 44 is defined in a side opposite the mouth 31 between the snap clamp 30 and the stock bar 20. The sprinkler reducer 50 is inserted into the space 44. Meanwhile, the locking means 40 has two second rotating shafts 41 on both ends thereof, so that the second rotating shafts 41 are rotatably inserted into the respective third shaft holes 32. Two second pressing parts 42 are provided by bending them inwards based on an axis passing through the second rotating shafts 41. A second handle 43 extends a predetermined length from the second pressing parts 42, thus allowing a user to hold the second handle 43 and rotate the locking means 40.

In the drawings, the locking operation of the snap clamp 30 and the locking means 40 is illustrated as being operated by the same principle as that of the mounting bracket 60, but the locking operation of the snap clamp 30 and the locking means 40 may be conducted by various methods well known in the related art.

Figure 4:
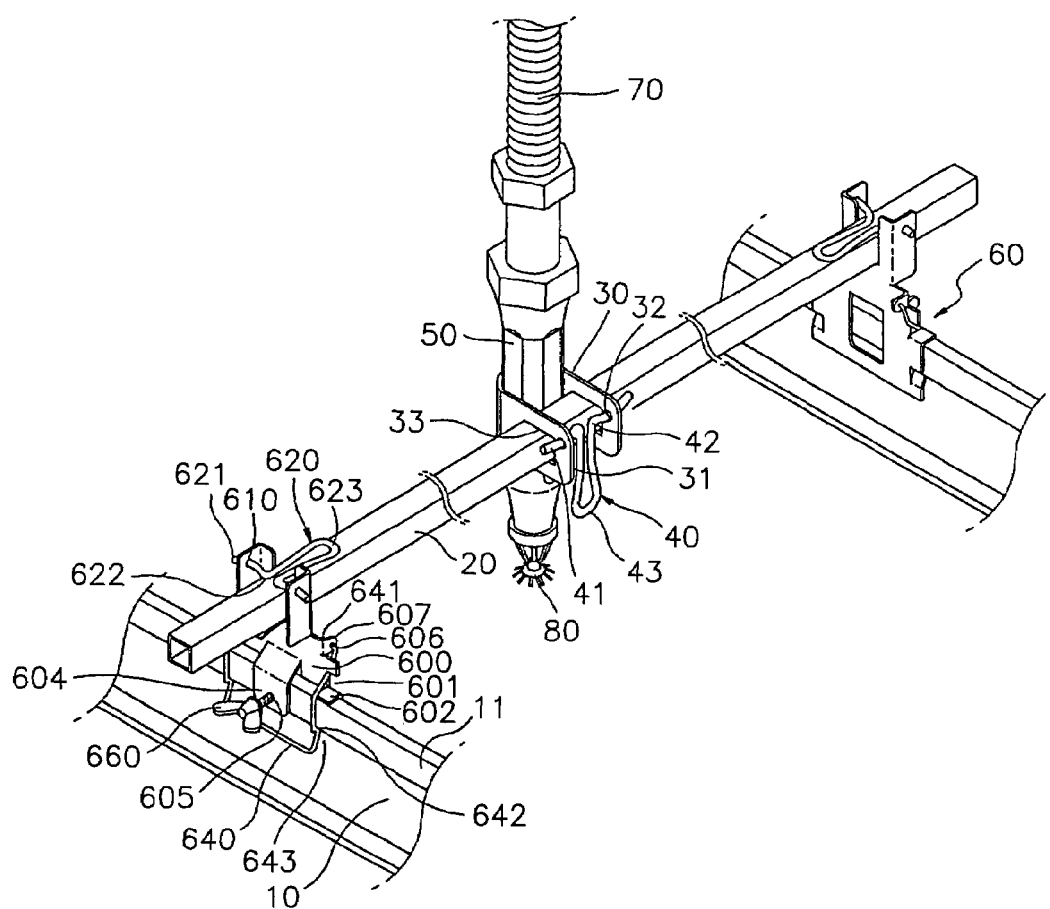
FIG. 4 is a perspective view showing the assembled sprinkler mounting structure of FIG. 2.

The sprinkler reducer 50 serves to couple a sprinkler head 80 to a water pipe 70, as shown in FIG. 4 showing the assembled state.

Meanwhile, each mounting bracket 60 comprises a bracket main body 600, a first locking unit 620, an elastic locking unit 640 and a wing bolt 660, which is a tightening means.

The bracket main body 600 of the mounting bracket 60 includes two insertion notches 601 which are formed in opposite side edges of the bracket main body 600. Two bent parts 602 are provided under the respective insertion notches 601 and correspond to the upper end of one T-bar 10. Two stoppers 603 are provided below the respective insertion notches 601 and correspond to the held part 11 of the T-bar 10. A coupling bent part 604 is provided at a central position in the bracket main body 600, so that the T-bar 10 is inserted into the coupling bent part 604. A bolt hole 605 is formed at a predetermined position through the coupling bent part 604. Two support protrusions 607 are bent inwards above the respective insertion notches 601. A first shaft hole 606 is formed through each support protrusion 607. A mounting part 608 is provided above the support protrusions 607, so that the stock bar 20 is placed over the mounting part 608. A second shaft hole 610 is formed through each sidewall of a mouth of the mounting part 608.

Furthermore, a bent support part 611 is provided on a lower end of the mounting part 608, so that the stock bar 20 is placed on the bent support part 611.

The first locking unit 620 includes two first rotating shafts 621 which are provided on opposite ends of the first locking unit 620, so that the first rotating shafts 621 are inserted into the respective second shaft holes 610 of the mounting part 608 of the bracket main body 600. The first locking unit 620 further includes two pressing parts 622 which are bent inwards based on an axis passing through the first rotating shafts 621, and a first handle 623 which protrudes from the pressing parts 622 so as to allow a user to hold the first handle 623 and rotate the first locking unit 620.

The elastic locking unit 640 includes two insertion parts 641 which are provided on opposite ends of the elastic locking unit 640 and are placed at an upper position, so that the insertion parts 641 are inserted into the respective first shaft holes 606 of the support protrusions 607 of the bracket main body 600. The elastic locking unit 640 further includes two hook parts 642 which extend downwards from the respective insertion parts 641 and are placed in the respective insertion notches 601 of the bracket main body 600, so that the hook parts 642 are hooked to the held part 11 of the T-bar 20. The elastic locking unit 640 further includes an insertion guide part 643 which extends downwards from the hook parts 642, so that the T-bar 10 is inserted between the bracket main body 600 and the elastic locking unit 640 while being guided by the insertion guide part 643.

The wing bolt 660 is tightened into the bolt hole 605 of the coupling bent part 604 of the bracket main body 600 so as to press a lower part of the held part 11 of the T-bar 10.

FIGS. 5A through 5D are views illustrating a sprinkler mounting process using one mounting bracket 60 having the above-mentioned construction.

Figure 5A:
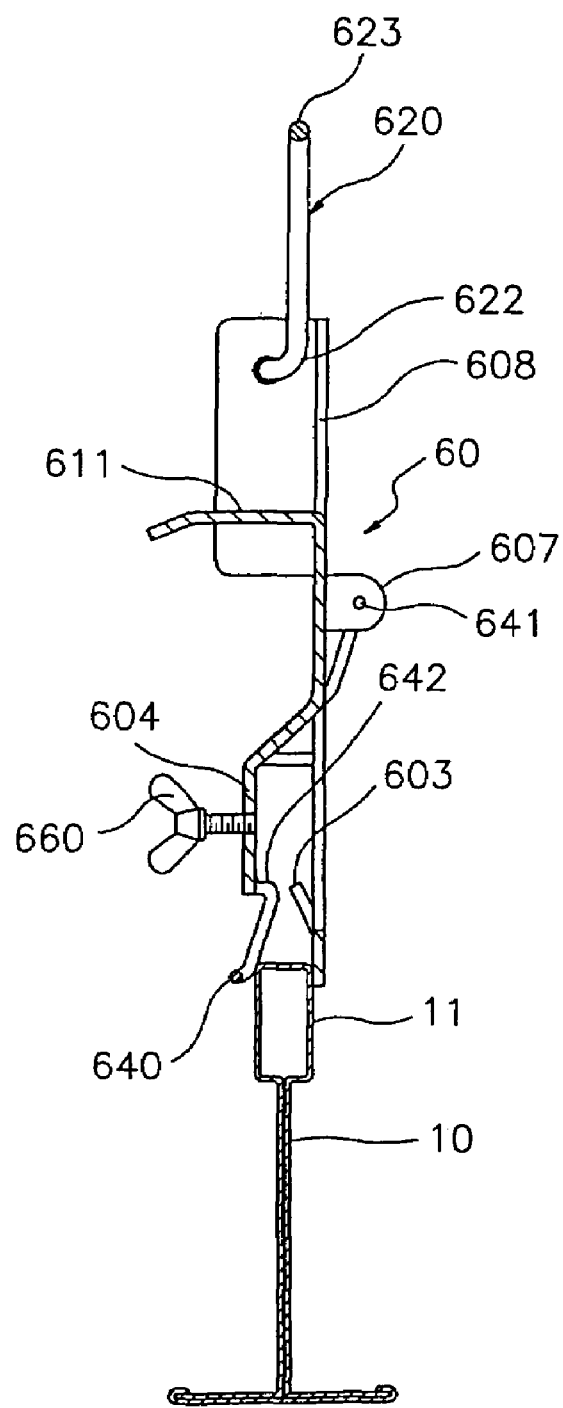

FIGS. 5A and 5B are views showing a process of coupling the mounting bracket 60 to the T-bar 10. As shown in these drawings, to couple the locking bracket 60 to the T-bar 10, when the locking bracket 60 is pushed onto the T-bar 10 while the T-bar 10 is guided by the insertion guide part 643 of the elastic locking unit 640, the gap between the elastic locking unit 640 and the bracket main body 600 is widened. When the locking bracket 60 is pushed further, the elastic locking unit 640 is hooked onto the held part 11 of the T-bar 10.

At this time, both the hook parts 642 of the elastic locking unit 640 and the stoppers 603 of the bracket main body 600 are hooked onto the lower end of the held part 11 of the T-bar 10. The bent parts 602 of the bracket main body 600 come into close contact with the upper surface of the held part 11. As such, the bracket main body 600 is fitted over the T-bar 10 and does not move upwards or downwards (see, FIG. 5B).

Figure 5C:
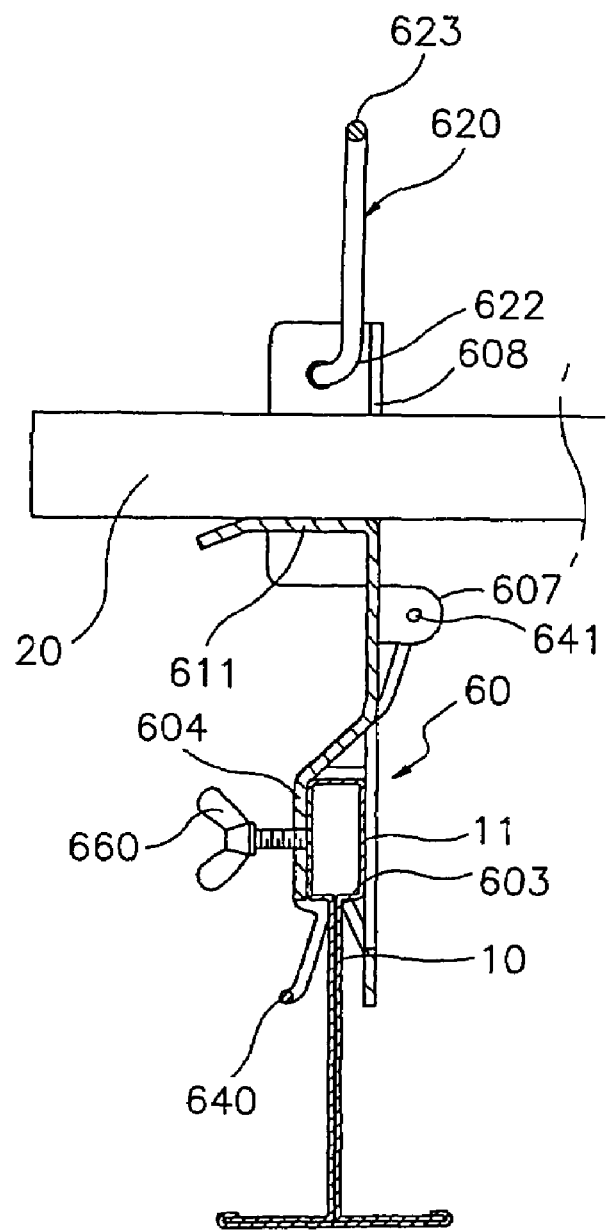

After the held part 11 of the T-bar 10 is held between the elastic locking unit 640 and the bracket main body 600, the wing bolt 660 is tightened into the bolt hole 605 of the coupling bent part 604 of the bracket main body 600. Then, the end of the wing bolt 660 presses the T-bar 10, as shown in FIG. 5C. Thereby, the bracket main body 600 is securely fastened to the T-bar 10 and does not move in a longitudinal direction of the T-bar 10 or in upward or downward direction.

Figure 5D:
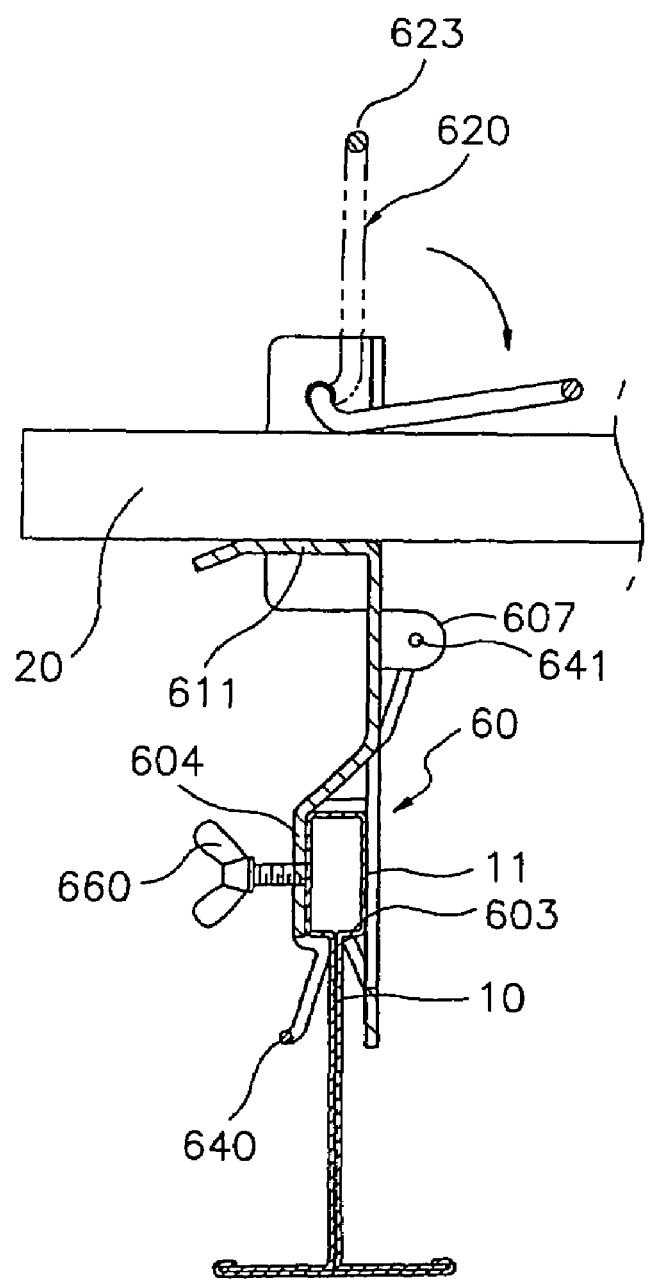
Figure 6:
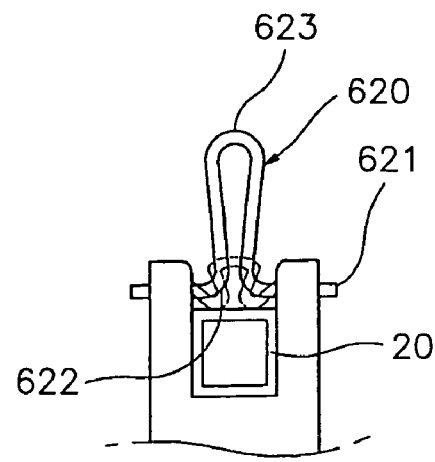
FIG. 6 is a view showing the stock bar spaced apart from a first pressing part of a first locking unit by rotating the first locking unit upwards from the state of FIG. 5D.

FIG. 5D is a view showing a process of mounting the stock bar 20 to the locking bracket 60.

First, a user rotates the first handle 623 of the first locking unit 620 upwards. Subsequently, the stock bar 20 is inserted into the mounting part 608 of the bracket main body 600.

At this time, because the first pressing parts 622 are spaced apart from the position at which the upper surface of the stock bar 20 is located when the stock bar 20 is placed in the mounting part 608, the first pressing parts 622 do not interrupt the insertion of the stock bar 20 into the mounting part 608.

After the stock bar 20 has been inserted into the mounting part 608, the user holds the first handle 623 and rotates it downwards. Then, the first pressing parts 622 press the stock bar 20 downwards, as shown in FIG. 5D. Thereby, the stock bar 20 is fastened to the mounting part 608.

Figure 7:
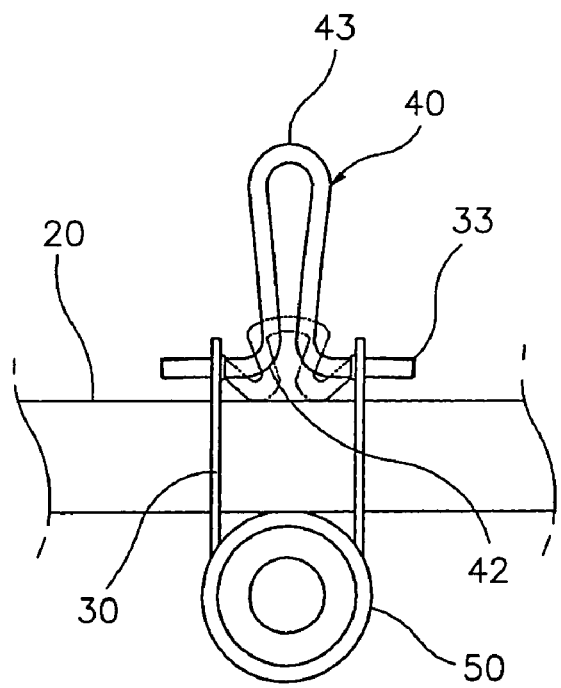
FIG. 7 is a view showing a process of mounting a sprinkler reducer to the stock bar using a snap clamp according to the present invention.

As such, after the stock bar 20 has been mounted to the T-bars 10 using the locking brackets 60 in a direction crossing the T-bars 10, the locking means 40, which is provided on the mouth 31 of the snap clamp 30 mounted to the stock bar 20, is rotated upwards. Then, the second pressing part 42 of the locking means 40 is positioned farthest away from the stock bar 20. In this state, the sprinkler reducer 50 is inserted into the space 44 between the snap clamp 30 and the stock bar 20. Thereafter, the user holds the second handle 43 and rotates the locking means 40 downwards. Then, as shown in FIG. 7, the second pressing part 42 of the locking means 40 presses the stock bar 20 and, simultaneously, pulls the snap clamp 30 towards the stock bar 20, thus holding the sprinkler reducer 50 between the stock bar 20 and the snap clamp 30.

In this state, ceiling panels are mounted under the T-bars 10. Thereafter, as shown in FIG. 4, the sprinkler head 80 is coupled to the sprinkler reducer 50, thus completing the sprinkler mounting process.

As described above, in the present invention, a locking bracket is easily securely coupled to a T-bar using an elastic locking unit and a wing bolt. Furthermore, a stock bar made of a standardized rectangular pipe is coupled to the locking bracket by a first locking unit such that the stock bar crosses over the T-bar. Because this locking bracket is manufactured as a separate component from the stock bar, the present invention can be used without limiting the distance between the T-bars. Furthermore, the present invention has an advantage in that a standardized rectangular pipe can be easily used as a stock bar merely by cutting the pipe to a desired length.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A stock bar and T-bar coupling structure for mounting a sprinkler, comprising:
   a pair of T-bars, with a held part provided along an upper end of each of T-bars; a stock bar having thereon a snap clamp, to which a sprinkler reducer is fastened by a locking means; and a pair of mounting brackets to couple the stock bar to the upper ends of the T-bars in a direction crossing the T-bars, wherein
   each of the mounting brackets comprises:
   a bracket main body, comprising: a pair of insertion notches formed in opposite side edges of the bracket main body; a pair of bent parts provided under the respective insertion notches and corresponding to the upper end of each T-bar; a pair of stoppers provided below the respective insertion notches and corresponding to the held part of the T-bar; a coupling bent part provided at a central position in the bracket main body, so that the T-bar is inserted into the coupling bent part, with a bolt hole formed at a predetermined position through the coupling bent part; a pair of support protrusions bent inwards above the respective insertion notches, with a pair of first shaft holes formed through the respective support protrusions; and a mounting part provided above the support protrusions, so that the stock bar is placed over the mounting part, with a pair of second shaft holes formed through the respective opposite sidewalls of a mouth of the mounting part;
   a first locking unit, comprising: a pair of first rotating shafts provided on opposite ends of the first locking unit, so that the first rotating shafts are inserted into the respective second shaft holes of the mounting part of the bracket main body; a pair of pressing parts bent inwards based on an axis passing through the first rotating shafts; and a first handle protruding from the pressing parts to allow a user to hold the first handle and rotate the first locking unit;
   an elastic locking unit, comprising: a pair of insertion parts provided on opposite ends of the elastic locking unit, so that the insertion parts are inserted into the respective first shaft holes of the support protrusions of the bracket main body; a pair of hook parts extending from the respective insertion parts and placed in the respective insertion notches of the bracket main body, so that the hook parts are hooked to the held part of the T-bar; and an insertion guide part extending downwards from the hook parts, so that the T-bar is inserted between the bracket main body and the elastic locking unit while being guided by the insertion guide part; and
   tightening means tightened into the bolt hole of the coupling bent part of the bracket main body and pressing a lower part of the held part of the T-bar.

2. The stock bar and T-bar coupling structure as set forth in claim 1, wherein the tightening means is a wing bolt.

3. The stock bar and T-bar coupling structure as set forth in claim 1, further comprising:
   a bent support part provided on a lower end of the mounting part of each of the mounting brackets.

* * * * *